(12) United States Patent
Peterson

(10) Patent No.: US 8,172,237 B2
(45) Date of Patent: May 8, 2012

(54) ACTIVE SUSPENSION AND ADAPTIVE DAMPING CONFIGURATION

(75) Inventor: John Ashley Peterson, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 94 days.

(21) Appl. No.: 12/417,738

(22) Filed: Apr. 3, 2009

(65) Prior Publication Data

US 2010/0253018 A1 Oct. 7, 2010

(51) Int. Cl.
*B60G 17/015* (2006.01)
*B60G 17/02* (2006.01)
*B60G 17/06* (2006.01)

(52) U.S. Cl. ............... 280/5.515; 267/64.21; 267/64.24; 280/124.157; 701/37

(58) Field of Classification Search ............ 188/298; 267/64.19, 64.21, 64.23, 64.24, 64.25, 64.27, 267/64.28, 122; 280/5.504, 5.515, 124.157, 280/124.16; 701/37
See application file for complete search history.

(56) References Cited

U.S. PATENT DOCUMENTS

| | | | | |
|---|---|---|---|---|
| 2,536,626 A | * | 1/1951 | Coleman ............... | 267/64.23 |
| 3,042,392 A | * | 7/1962 | Schmitz et al. ........ | 280/124.102 |
| 3,246,905 A | * | 4/1966 | Frank .................... | 280/6.159 |
| 3,331,601 A | * | 7/1967 | Riehl ..................... | 267/64.19 |
| 3,627,297 A | * | 12/1971 | Gaydecki ............... | 267/118 |
| 4,325,541 A | * | 4/1982 | Korosladanyi et al. ...... | 267/220 |
| 4,445,673 A | * | 5/1984 | Clark .................... | 267/64.24 |
| 4,468,050 A | * | 8/1984 | Woods et al. .......... | 280/5.514 |
| 4,468,739 A | * | 8/1984 | Woods et al. .......... | 701/37 |
| 4,534,580 A | * | 8/1985 | Kobayashi et al. ..... | 280/124.108 |
| 4,555,096 A | * | 11/1985 | Pryor ..................... | 267/64.21 |
| 4,629,170 A | * | 12/1986 | Warmuth, II ........... | 267/64.27 |
| 4,647,069 A | | 3/1987 | Iijima | |
| 4,655,438 A | * | 4/1987 | Cameron ............... | 267/220 |
| 4,666,135 A | * | 5/1987 | Buma et al. ............ | 267/64.21 |
| 4,722,548 A | | 2/1988 | Hamilton et al. | |
| 4,771,994 A | * | 9/1988 | Makita .................. | 267/64.21 |
| 4,861,067 A | | 8/1989 | Booher | |
| 4,934,667 A | * | 6/1990 | Pees et al. .............. | 267/64.21 |
| 4,970,645 A | | 11/1990 | Adachi | |
| 5,071,159 A | * | 12/1991 | Kamimura et al. ..... | 280/5.507 |
| 5,346,242 A | | 9/1994 | Karnopp | |
| 5,413,316 A | * | 5/1995 | Easter ................... | 267/64.24 |
| 5,513,108 A | | 4/1996 | Kishimoto et al. | |
| 5,954,316 A | * | 9/1999 | Voss ...................... | 267/64.27 |

(Continued)

FOREIGN PATENT DOCUMENTS

DE 19940198 2/2001

(Continued)

OTHER PUBLICATIONS

EP Search Report dated May 18, 2011.

*Primary Examiner* — Paul N Dickson
*Assistant Examiner* — Laura Freedman
(74) *Attorney, Agent, or Firm* — Carlson, Gaskey & Olds, PC

(57) ABSTRACT

A vehicle suspension utilizes an active air suspension system in combination with an adaptive damping system to provide a desired ride and handling output. The active air suspension and adaptive damping system can operate independently of each other, or can work in conjunction with each other to provide the desired output.

21 Claims, 3 Drawing Sheets

U.S. PATENT DOCUMENTS

| | | | | |
|---|---|---|---|---|
| 6,073,491 | A * | 6/2000 | Fischer et al. | 73/629 |
| 6,412,759 | B1 * | 7/2002 | Krauss | 267/64.23 |
| 6,536,749 | B1 * | 3/2003 | Luhmann et al. | 267/64.19 |
| 6,604,734 | B1 * | 8/2003 | Griffiths | 267/64.14 |
| 6,695,294 | B2 * | 2/2004 | Miller et al. | 267/64.16 |
| 6,721,641 | B1 | 4/2004 | Denne | |
| 6,725,983 | B2 * | 4/2004 | Bell | 188/269 |
| 6,840,525 | B1 * | 1/2005 | Griffiths | 280/124.116 |
| 6,923,434 | B2 * | 8/2005 | Schisler | 267/64.27 |
| 7,104,561 | B1 * | 9/2006 | Griffiths | 280/124.157 |
| 7,156,382 | B2 * | 1/2007 | Lloyd | 267/64.28 |
| 7,213,799 | B2 * | 5/2007 | Behmenburg et al. | 267/64.24 |
| 7,252,181 | B2 * | 8/2007 | Lemmens | 188/322.13 |
| 7,287,760 | B1 | 10/2007 | Quick et al. | |
| 7,380,799 | B2 * | 6/2008 | Niaura et al. | 280/5.519 |
| 7,621,538 | B2 * | 11/2009 | Nordmeyer et al. | 280/5.515 |
| 7,775,535 | B2 * | 8/2010 | Bluff et al. | 280/124.116 |
| 7,815,199 | B2 * | 10/2010 | Peterson | 280/5.515 |
| 7,942,427 | B2 * | 5/2011 | Lloyd | 280/6.157 |
| 2005/0093265 | A1 | 5/2005 | Niaura et al. | |
| 2005/0173851 | A1 | 8/2005 | Lloyd | |
| 2006/0219503 | A1 * | 10/2006 | Kim | 188/282.2 |
| 2006/0267297 | A1 | 11/2006 | Nordmeyer et al. | |
| 2007/0073461 | A1 | 3/2007 | Fielder | |
| 2008/0054537 | A1 * | 3/2008 | Harrison | 267/64.16 |
| 2010/0230910 | A1 * | 9/2010 | Kleckner et al. | 280/5.5 |
| 2010/0230912 | A1 * | 9/2010 | Lloyd | 280/5.503 |
| 2010/0230913 | A1 * | 9/2010 | Peterson | 280/5.503 |
| 2010/0253017 | A1 * | 10/2010 | VanRaaphorst | 280/5.504 |
| 2010/0259018 | A1 * | 10/2010 | Honig et al. | 280/5.514 |

FOREIGN PATENT DOCUMENTS

| | | |
|---|---|---|
| DE | 10163552 | 7/2003 |
| EP | 1707407 | 10/2006 |
| GB | 2406548 | 4/2005 |
| JP | 62137212 | 6/1987 |

\* cited by examiner

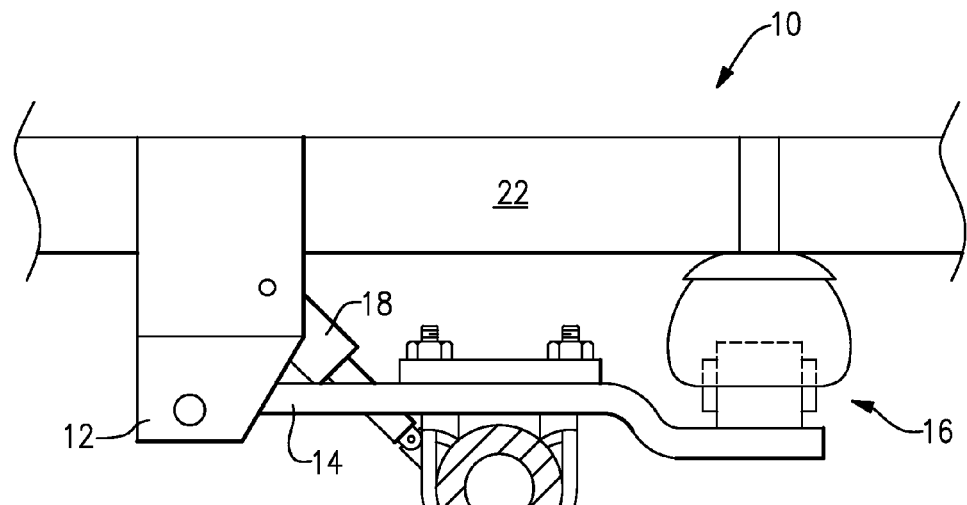
FIG.1
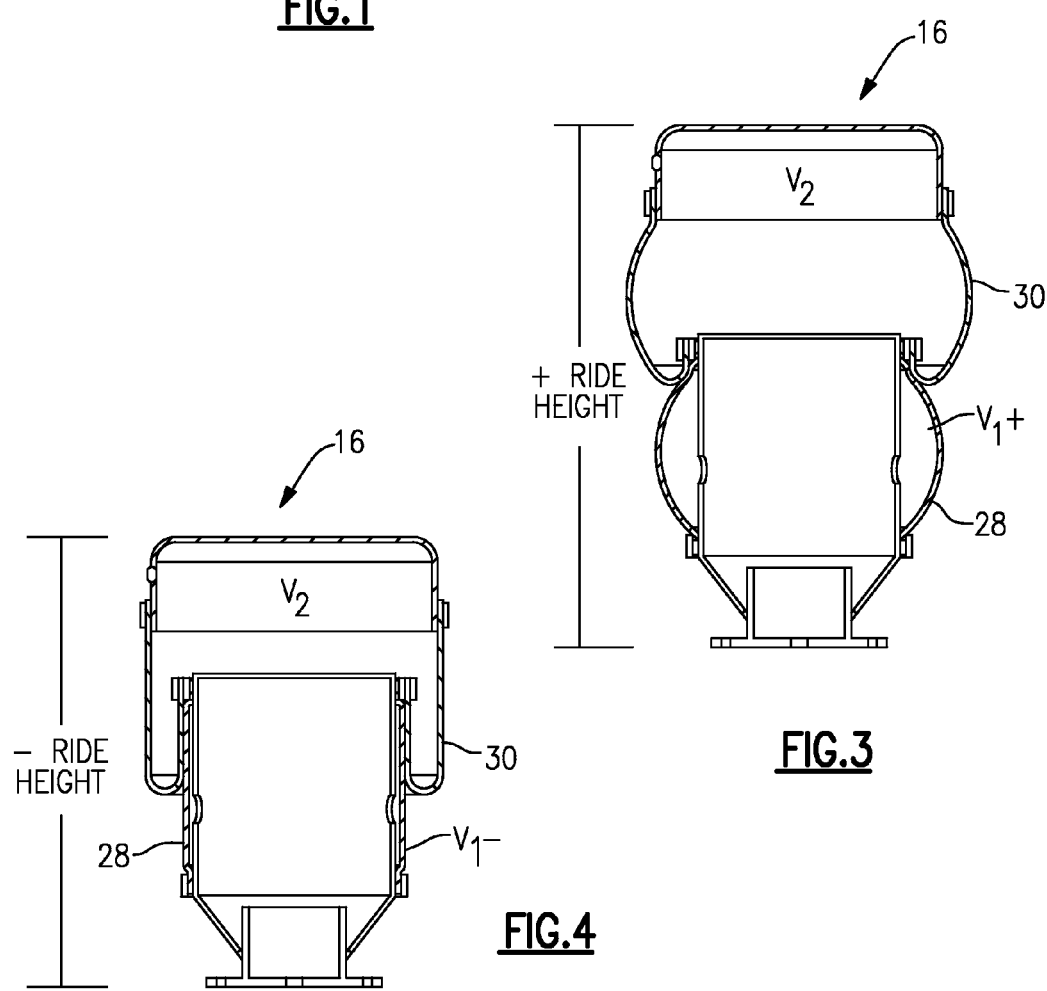
FIG.3
FIG.4

ACTIVE SUSPENSION AND ADAPTIVE DAMPING CONFIGURATION

TECHNICAL FIELD

This invention generally relates to an active air suspension system used in combination with adaptive damping.

BACKGROUND OF THE INVENTION

Air suspensions utilize air springs to provide desired output characteristics, such as ride comfort and vehicle performance for example. One known active air suspension uses an air spring assembly that includes a primary airbag mounted around a piston airbag such that the piston airbag provides a rolling surface for the primary airbag. A change in piston airbag volume changes an effective piston area of the primary airbag. A relatively small change in the effective piston area provides a change in a spring rate of the air spring assembly. The pressures in the piston airbag and the primary airbag are selectively controlled to provide infinite variation in spring rates without requiring any auxiliary tanks and associated actuators. The smaller volume of the piston airbag relative to the larger volume of the primary airbag permits rapid pressure and volume changes to enable active suspension control.

Traditionally, active air suspension systems have made gross discrete changes in suspension spring stiffness through switchable air spring volumes. The active air suspension with a dual air spring configuration described above is a force and a spring stiffness adjusting device. One problem with such a system is that the natural frequency of the spring assembly changes during the active control. An improved control configuration is needed to address these changing natural frequencies.

SUMMARY OF THE INVENTION

A vehicle suspension utilizes an active air suspension system in combination with an adaptive damping system to provide a desired ride and handling output.

In one example, the active air suspension and adaptive damping system operate independently of each other. A controller generates control signals to control the active air suspension and generates separate control signals to control the adaptive damping system. A single controller can be used or separate controller can be use for each of the active air suspension and adaptive damping system.

In another example, the adaptive damping system and the active air suspension work in conjunction with each other to provide the desired output. The controller can vary spring characteristics in the active air suspension in response to measured or determined changes in the adaptive damping system. Optionally, the controller can vary damper characteristics in the adaptive damping system in response to measured or determined changes in the active air suspension.

In another example, when one of the adaptive damping system or active air suspension system experiences a change in characteristic, the controller issues a notification signal to the other of the adaptive damping system and active air suspension. In response to the notification signal, the adaptive damping system or active air suspension would then switch to pre-determined system characteristic that is linked the notification signal.

These and other features of the present invention can be best understood from the following specification and drawings, the following of which is a brief description.

BRIEF DESCRIPTION OF THE DRAWINGS

FIG. 1 is a general side view of one example of an active air suspension as installed on a vehicle.

FIG. 3 is a sectional view of the air spring in a first position.

FIG. 4 is a sectional view of the air spring in a second position.

DETAILED DESCRIPTION OF THE PREFERRED EMBODIMENT

Figure 2:
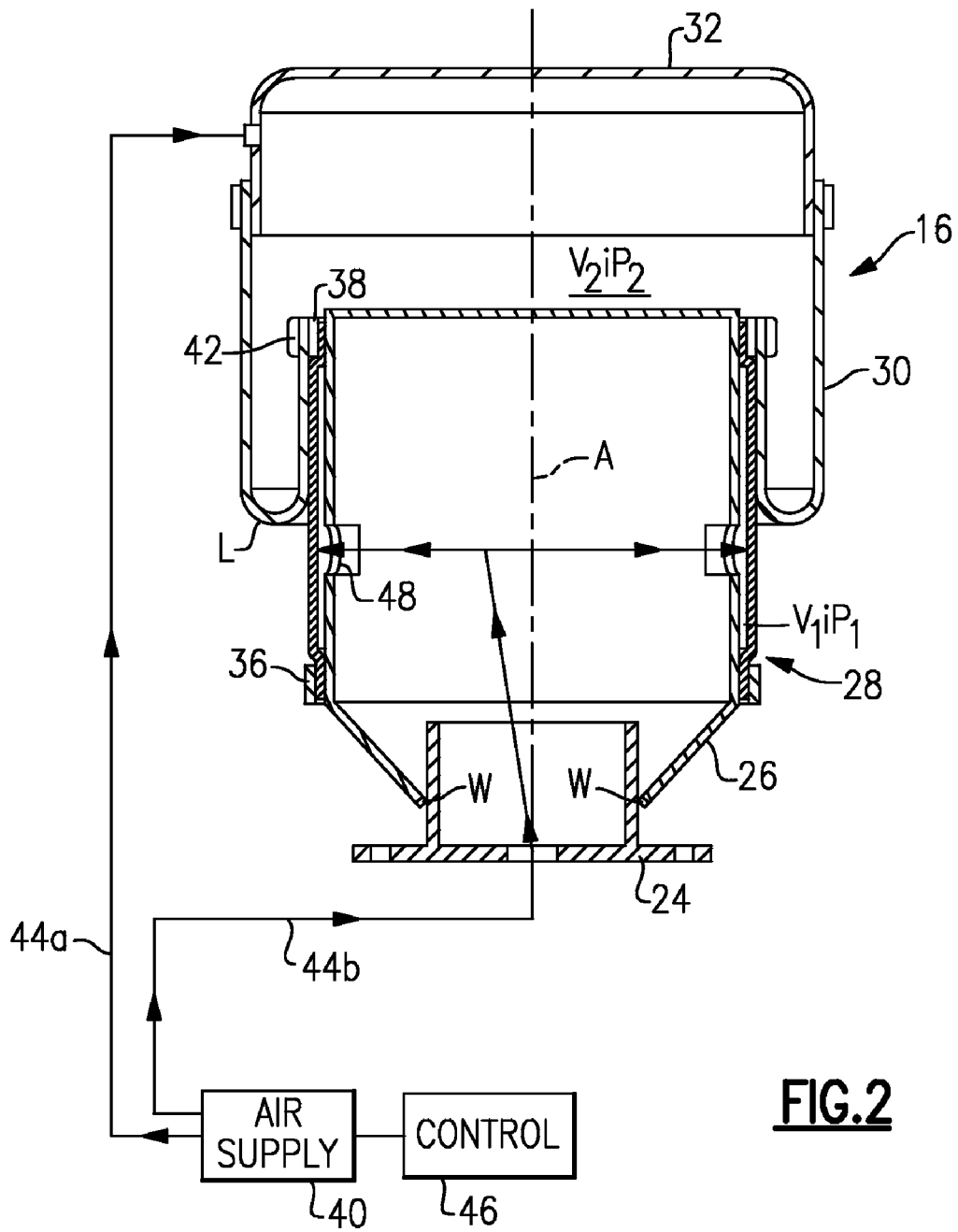
FIG. 2 is a sectional view of an air spring assembly as used in the active air suspension of FIG. 1.

FIG. 1 illustrates an air suspension system 10 for a vehicle. The air suspension system 10 generally includes a bracket 12, a longitudinal member 14, an air spring assembly 16, a damper 18, and an axle assembly 20. The air suspension system 10 is fixed to a frame or chassis of the vehicle (shown schematically at 22). The longitudinal member 14 could comprise a suspension arm, for example, and the axle assembly 20 could comprise any type of axle, such as a drive axle, non-drive axle, trailer axle, etc. The axle assembly 20 extends between laterally spaced wheels (not shown). It should be understood that the air suspension system 10 includes a longitudinal member 14, an air spring assembly 16, and a damper 18 at each lateral end of the axle.

Referring to FIG. 2, the air spring assembly 16 is illustrated in cross-section. The air spring assembly 16 is defined along a central vertical axis A and includes a lower mount 24 (illustrated schematically), a piston structure or support 26 attached to the lower mount 24, a piston airbag 28, and a primary airbag 30. An upper mount 32 is attached to the primary airbag 30. The upper 32 and lower 24 mounts provide attachment for the air spring assembly 16 between the longitudinal member 14 and chassis 22 (see FIG. 1).

The piston support 26 is a cylindrical member defined about the axis A. At the lower mount 24 the piston support 26 can be attached to many different structures such as a strut, shock, damper, or other similar mechanism, for example. In one example, the piston support 26 is attached to the lower mount 24 at welds W; however other attachment methods could also be used. The piston support 26 and the lower mount 24 are relatively rigid components.

The piston airbag 28 is a flexile, resilient member and is attached to the piston support 26 through a first band 36 and a second band 38. The first band 36 is secured at a lower end of the piston support 26 and the second band 28 is secured at an upper or opposite end of the piston support 26. While bands are shown, it should be understood that other attachment structures and/or methods could be used to secure the piston airbag 28 to the piston support 26. The piston airbag 28 defines a first volume V1 that is enclosed vertically between the bands 36, 38 and between an inner surface of the piston airbag 28 and an outer surface of the piston support 26.

The primary airbag 30 is mounted to the piston air bag 28 through a third band 42 which is spaced radially outwardly relative to the second band 38 with the primary airbag being located between the second 28 and third 42 bands. In other words, the primary airbag 30 is sandwiched between the third band 42 and the second band 38. The primary airbag 30 defines a second volume V2. It should be understood that while two volumes V1, and V2 are disclosed in the illustrated embodiment, additional volumes could also be utilized within the spring assembly 16 as needed. Further, any of these volumes may be selectively segmented to provide further incremental volume changes.

An air supply system 40 (illustrated schematically in FIG. 2) communicates air independently into the volumes V1, V2 through a first and a second supply conduits 44a, 44b respectively in response to a controller 46 (illustrated schematically). The controller 46 is a suspension controller that provides active suspension control methodology. Ports 48 through the piston support 26 supply air into the first volume V1.

The piston airbag 28 operates as a rolloff piston surface for the primary airbag 30. In other words, the primary airbag 30 provides a rolling lobe L over a piston assembly having a variable diameter provided by the variable volume of the piston airbag 28. As the air spring assembly 16 experiences road load inputs, the lobe L of the primary airbag 30 rolls along the outer surface of the piston airbag 28. By changing the volume V1 or pressure P1 within the piston airbag 28 the outer diameter of the piston airbag 28 changes. A change in the piston airbag 28 volume V1 thereby changes the effective piston area of the primary air spring 30. It is also understood that the primary airbag 30 will exert a pressure P2 against the piston airbag 28, tending to reduce the outer diameter of the piston airbag 28 until an equilibrium diameter is reached. Therefore a change in pressure P1 will change the radial spring rate of the piston airbag 28 and change the equilibrium diameter also affecting the primary airbag spring rate.

Referring to FIG. 3, increasing the air pressure within the volume V1 increases the diameter of the piston airbag 28 to obtain a greater spring rate and ride height. That is, the increase in diameter of the piston airbag 28 results in an extension of the airbag assembly 16 as volume V1 effectively provides a larger rolloff piston. The opposite results are obtained when the pressure within the piston airbag 28 is reduced as volume V1 respectively decreases (FIG. 4). This reduces the ride height and spring rate.

A relatively small change in volume V1 provides a change in the spring rate of the primary air spring 30 as the diameter of the rolloff surface is selectively modified. A change in the pressure within the volume V1 couples a change in spring rate with a change in ride height when the pressure within volume V2 is maintained. The compression and rebound rates may alternatively be decoupled by simultaneously changing the volume of both V1 and V2.

By selectively controlling the pressure within volumes V1 and V2, infinite variation in spring rates are provided without an auxiliary tank and associated actuators. The relatively smaller volume of volume V1 relative to volume V2 permits rapid pressure and volume changes which enables active suspension control.

Figure 5:
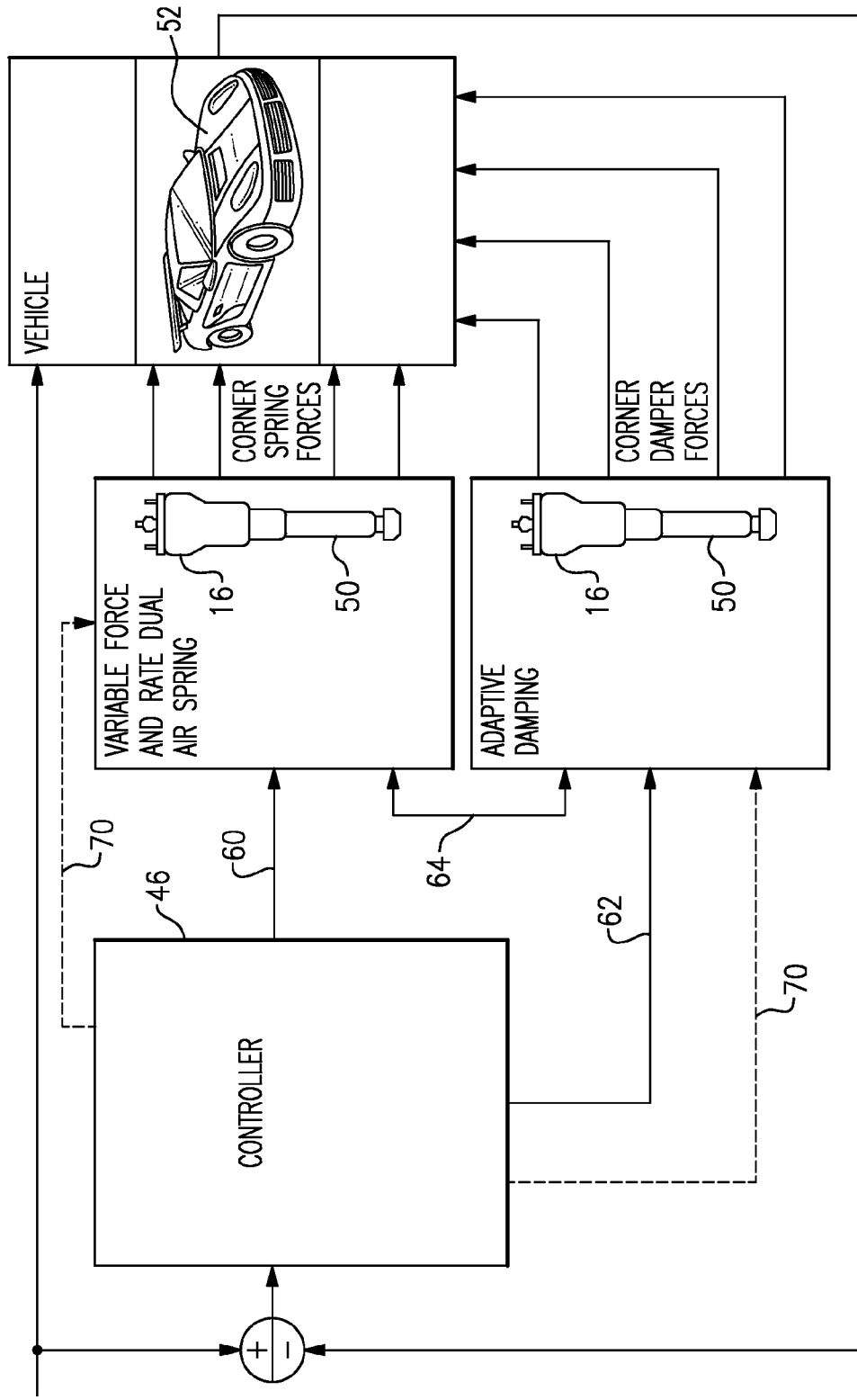
FIG. 5 is a diagram showing air spring and damper assemblies for a vehicle.

In the example shown in FIG. 5, each air spring assembly 16 is associated with one damper 50. In one example, the damper 50 comprises an electrically controlled shock absorber. An outer structure of the damper 50 is attached to the lower mount 24 of the air spring assembly 16. There is one air spring and damper combination associated with each wheel, i.e. corner, of the vehicle 52 shown in FIG. 5.

The subject vehicle suspension utilizes the active air suspension system in combination with an adaptive damping system to provide a desired ride and handling output. In one example, the active air suspension and adaptive damping system operate independently of each other as indicated at 60, 62. The controller 46 generates control signals 60 to control the active air suspension and generates separate control signals 62 to control the adaptive damping system. The controller 46 can be single controller or a separate controller can be use for each of the active air suspension and adaptive damping system.

In another example, the adaptive damping system and the active air suspension work in conjunction with each other, i.e. are fully integrated with each other, to provide the desired output as indicated at 64. The controller 46 can vary spring characteristics in the active air suspension in response to measured or determined changes in the adaptive damping system. Optionally, the controller 46 can varying damper characteristics in the adaptive damping system in response to measured or determined changes in the active air suspension.

In another example, when one of the adaptive damping system or active air suspension system experiences a change in characteristic, the controller issues a notification signal 70 to the other of the adaptive damping system and active air suspension. In response to the notification signal 70, the adaptive damping system or active air suspension would then switch to pre-determined system characteristic that is linked the notification signal.

In one example, the controller 46 is configured to use the variable force and rate dual air spring configuration in combination with adaptive damping at the damper 50 to maintain a constant damping coefficient for each air spring assembly.

The damping coefficient is defined as 2 times the square root of the spring stiffness as multiplied by the mass:

$$C = 2\sqrt{mk}$$

C—damping coefficient
K—spring stiffness
M—unsprung mass

The active air suspension system changes k based on the following formula:

$$K = \frac{nA_e^2 P_0}{V} + P_g \frac{dA_e}{dZ}$$

K=spring stiffness
n=ratio of specific heats, $c_p/c_v$
$A_e$=effective piston area
$P_0$=atmospheric pressure
V=volume of air in main spring
$P_g$=gauge pressure
Z=displacement or height For the adaptive damping system, the controller 46 can modify the damping coefficient based on suspension velocity states, vehicle roll/pitch/heave velocity states, and/or active air spring stiffness changes.

In on example configuration, during vehicle operation the controller 46 actively controls and varies spring force and rate at each of the air spring assemblies 16 by controlling air flow into and out of each of the piston 28 and primary 30 airbags. This accordingly results in a change of the spring stiffness. The controller 46 generates control signals to actively vary the damping coefficient in response to accommodate changes in the spring stiffness.

For example, the controller 46 would change the damping coefficient by determining a real-time required force needed to damp undesired wheel and body oscillations that could occur from the variance of the spring stiffness. The oscillations can be measured directly or semi-directly by using various sensors. Further, the spring stiffness can be determined indirectly. Pressures within the primary and piston air bags are known variables that are monitored by the controller 46. Based on these pressures, the controller 46 accesses a look-up table to determine spring stiffness.

In one example, each time the controller 46 determines that there has been change in a specific spring characteristic, the controller 46 generates an electric control signal to correspondingly change/vary the damping coefficient. Optionally, the controller 46 could also vary and adjust the spring stiffness in response to changes of the damping coefficient.

In a non-integrated control system, the active air suspension system and adaptive damping system operate independently of each other. The adaptive damping system is controlled to accommodate suspension velocities without knowledge of changes in the spring rate. Further, the active air suspension system is controlled to provide desired spring characteristics without knowledge of changes within the adaptive damping system.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle suspension comprising:
   an active air suspension including at least one air spring assembly including a piston airbag and a primary air bag mounted around said piston airbag such that said piston airbag provides a rolloff piston surface for said primary air bag, said at least one air spring assembly having a spring characteristic;
   an adaptive damping system including at least one damper associated with said at least one air spring assembly, said at least one damper having a damping characteristic, and wherein said adaptive damping system works in conjunction with said active air suspension to provide a desired vehicle ride and handling output; and
   a controller that generates electric control signals to actively vary at least one of said damping characteristic and said spring characteristic to provide the desired vehicle ride and handling output, and wherein said controller generates control signals to vary air flow in and out of the piston and primary airbags and generates control signals to control the damping characteristic to maintain a constant damping coefficient for said air spring assembly.

2. The vehicle suspension according to claim 1 wherein said damping characteristic comprises a damper coefficient and wherein said spring characteristic comprises a spring stiffness, and wherein said controller varies said damper coefficient by determining a force required to damp undesirable oscillations generated by variations in said spring stiffness.

3. The vehicle suspension according to claim 2 wherein said controller identifies undesirable oscillations by measuring and monitoring wheel and body oscillations and wherein said controller indirectly determines changing spring stiffnesses based on known pressures within said piston and primary air bags and a look-up table that links spring stiffnesses with pressure levels.

4. The vehicle suspension according to claim 1 wherein said damping characteristic comprises a damper coefficient and wherein said spring characteristic comprises a spring stiffness, and wherein said controller varies said spring stiffness to maintain a desired damper coefficient.

5. The vehicle suspension according to claim 1 wherein said active air suspension and said adaptive damping system operate independently of each other.

6. The vehicle suspension according to claim 5 wherein said controller issues one set of electric control signals to vary said spring characteristic and a separate set of electric control signals to vary said damping characteristic.

7. The vehicle suspension according to claim 1 wherein said at least one damper comprises an electrically controlled shock absorber.

8. The vehicle suspension according to claim 1 wherein said at least one damper is generally concentric with said at least one air spring assembly.

9. The vehicle suspension according to claim 1 wherein said controller varies spring characteristics in the active air suspension in response to determined changes in the adaptive damping system and/or varies damping characteristics in the adaptive damping system in response to determined changes in the active air suspension.

10. The vehicle suspension according to claim 1 wherein said spring characteristic comprises spring force and rate and said damping characteristic comprises a damping coefficient, and wherein said controller varies said spring force and rate of said air spring assembly by controlling air flow into and out of said piston and primary airbags, and varies said damping coefficient in said damper to respond to changes in spring stiffness resulting from the variance of said spring force and rate.

11. The vehicle suspension according to claim 10 wherein said controller identifies vehicle oscillations resulting from the variance of said spring stiffness, determines a real-time force required to damp the identified vehicle oscillations, and changes said damping coefficient to provide said force required to damp said identified vehicle oscillations.

12. A vehicle suspension comprising:
    an active air suspension including at least one air spring assembly having a piston airbag and a primary air bag mounted around said piston airbag, said at least one air spring assembly having a spring characteristic; and
    an adaptive damping system including at least one damper associated with said at least one air spring assembly, said at least one damper having a damping characteristic, and wherein said adaptive damping system works in conjunction with said active air suspension to provide a desired vehicle ride and handling output; and
    a controller that generates electric control signals to actively vary at least one of said damping characteristic and said spring characteristic, and wherein said controller generates a notification signal that is communicated to said adaptive damping system in response to a change in said spring characteristic, and wherein said adaptive damping system switches to a different predetermined gain schedule in response to said notification signal.

13. A method of controlling a vehicle suspension comprising the steps of:
    (a) providing an active air suspension including at least one air spring assembly comprising a piston airbag and a primary air bag mounted around the piston airbag such that the piston airbag provides a rolloff piston surface for the primary airbag, the at least one air spring assembly having a spring characteristic;
    (b) associating an adaptive damping system with the active air suspension, the adaptive damping system including at least one damper associated with the at least one air spring assembly and having a damping characteristic; and
    (c) generating electric control signals to actively vary at least one of the damping characteristic and spring characteristic to provide a desired vehicle ride and handling output, and including actively controlling air flow in and out of the piston and primary airbags and actively controlling the damper to maintain a constant damping coefficient for each air spring assembly.

14. The method according to claim 13 wherein the damping characteristic comprises a damper coefficient and wherein the spring characteristic comprises a spring stiffness, and including varying the damper coefficient by determining a force required to damp undesirable oscillations generated by variations in the spring stiffness.

15. The method according to claim 13 including identifying undesirable oscillations by measuring and monitoring wheel and body oscillations and indirectly determining changing spring stiffnesses based on known pressures within the piston and primary air bags and a look-up table that links spring stiffnesses with pressure levels.

16. The method according to claim 13 wherein the damping characteristic comprises a damper coefficient and wherein the spring characteristic comprises a spring stiffness, and including varying the spring stiffness to maintain a desired damper coefficient.

17. The method according to claim 13 including operating the active air suspension and the adaptive damping system independently of each other.

18. The method according to claim 13 including varying spring characteristics in the active air suspension in response to determined changes in the adaptive damping system and/or varying damping characteristics in the adaptive damping system in response to determined changes in the active air suspension.

19. The method according to claim 13 wherein the spring characteristic comprises spring force and rate and the damping characteristic comprises a damping coefficient, and including varying the spring force and rate of the air spring assembly by controlling air flow into and out of the piston and primary airbags, and including varying the damping coefficient in the damper to respond to changes in spring stiffness resulting from the variance of the spring force and rate.

20. The method according to claim 19 including identifying vehicle oscillations resulting from the variance of the spring stiffness, determining a real-time force required to damp the identified vehicle oscillations, and changing the damping coefficient to provide the force required to damp the identified vehicle oscillations.

21. A method of controlling a vehicle suspension comprising the steps of:
   (a) providing an active air suspension including at least one air spring assembly comprising a piston airbag and a primary air bag mounted around the piston airbag, the at least one air spring assembly having a spring characteristic;
   (b) associating an adaptive damping system with the active air suspension, the adaptive damping system including at least one damper associated with the at least one air spring assembly and having a damping characteristic;
   (c) generating electric control signals to actively vary at least one of the damping characteristic and spring characteristic to provide a desired vehicle ride and handling output; and
   (d) generating a notification signal that is communicated to the adaptive damping system in response to a change in the spring characteristic, and including switching the adaptive damping system to a different predetermined gain schedule in response to the notification signal.

* * * * *